United States Patent
Bowling et al.

(10) Patent No.: US 10,487,766 B2
(45) Date of Patent: *Nov. 26, 2019

(54) MASS-AIRFLOW MEASUREMENT CONVERSION APPARATUS FOR INTERNAL COMBUSTION ENGINE CARBURETORS

(71) Applicant: BG SOFLEX LLC, Virginia Beach, VA (US)

(72) Inventors: Bruce A. Bowling, Linthicum Heights, MD (US); Albert C. Grippo, Virginia Beach, VA (US)

(73) Assignee: BG SOFLEX LLC, Virginia Beach, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/162,864

(22) Filed: Oct. 17, 2018

(65) Prior Publication Data
US 2019/0048819 A1 Feb. 14, 2019

Related U.S. Application Data

(63) Continuation of application No. 15/484,031, filed on Apr. 10, 2017, now Pat. No. 10,132,261, which is a
(Continued)

(51) Int. Cl.
*F02D 41/18* (2006.01)
*G01M 15/09* (2006.01)
(Continued)

(52) U.S. Cl.
CPC ............ *F02D 41/182* (2013.01); *F02M 19/10* (2013.01); *G01F 1/34* (2013.01); *G01K 13/02* (2013.01);
(Continued)

(58) Field of Classification Search
CPC ......... F02D 41/182; F02M 19/10; G01F 1/34; G01K 13/02; G01K 2013/024; G01M 15/042; G01M 15/09; Y10T 29/49233
See application file for complete search history.

(56) References Cited

U.S. PATENT DOCUMENTS 3,691,824 A 9/1972 Vanderbilt, Jr.
3,980,061 A 9/1976 McAlister
(Continued)

FOREIGN PATENT DOCUMENTS

GB 1417703 A 12/1975

*Primary Examiner* — Kyle R Quigley
(74) *Attorney, Agent, or Firm* — Kilpatrick Townsend & Stockton LLP (57) ABSTRACT

A controller for an electronic fuel injection system for an internal combustion engine includes: a plurality of analog-to-digital (A/D) converters; a memory; and a processor communicatively coupled to the A/D converters and the memory. The A/D converters are configured to receive analog electrical signals representing pressures generated by a plurality of pressure sensors disposed at different locations along an air intake path and output corresponding digital signals representing the pressures, one or more of the pressure sensors are disposed in a body of a carburetor rendered permanently inoperable to mix fuel with air flowing in the air intake path, and the processor is configured to receive the digital signals representing the pressures output from the A/D converters and output a mass air flow signal representing a mass air flow rate as to an engine management system to control the electronic fuel injection system based on the received pressure signals.

16 Claims, 5 Drawing Sheets

Related U.S. Application Data continuation of application No. 14/737,966, filed on Jun. 12, 2015, now Pat. No. 9,651,455, which is a continuation of application No. 13/211,467, filed on Aug. 17, 2011, now Pat. No. 9,222,851.

(60) Provisional application No. 61/374,473, filed on Aug. 17, 2010.

(51) Int. Cl.
  *G01F 1/34* (2006.01)
  *G01K 13/02* (2006.01)
  *G01M 15/04* (2006.01)
  *F02M 19/10* (2006.01)

(52) U.S. Cl.
  CPC .......... *G01M 15/042* (2013.01); *G01M 15/09* (2013.01); *G01K 2013/024* (2013.01); *Y10T 29/49233* (2015.01)

(56) References Cited

U.S. PATENT DOCUMENTS

| | | |
|---|---|---|
| 4,095,580 A | 6/1978 | Murray et al. |
| 4,664,085 A | 5/1987 | Kataoka |
| 5,473,949 A | 12/1995 | Cage et al. |
| 5,573,474 A | 10/1996 | Marsh et al. |
| 5,809,972 A | 9/1998 | Grant |
| 6,186,117 B1 | 2/2001 | Matte |
| 6,363,312 B1 | 3/2002 | Griffin |
| 6,701,890 B1 | 3/2004 | Suhre |
| 7,607,422 B2 | 10/2009 | Carlson et al. |
| 9,222,851 B2 | 12/2015 | Bowling et al. |
| 9,651,455 B2 | 5/2017 | Bowling |
| 2004/0172188 A1 | 9/2004 | Bowling et al. |
| 2005/0247292 A1 | 11/2005 | Halsmer |
| 2009/0088950 A1 | 4/2009 | Fisher et al. |
| 2010/0077993 A1 | 4/2010 | Satterfield |
| 2011/0180042 A1 | 7/2011 | Johnson et al. |

MASS-AIRFLOW MEASUREMENT CONVERSION APPARATUS FOR INTERNAL COMBUSTION ENGINE CARBURETORS

CROSS-REFERENCE TO RELATED APPLICATIONS

This application is a continuation of U.S. application Ser. No. 15/484,031 filed on Apr. 10, 2017, which is a continuation of U.S. application Ser. No. 14/737,966 filed on Jun. 12, 2015, now U.S. Pat. No. 9,651,455, which is a continuation of U.S. application Ser. No. 13/211,467 filed on Aug. 17, 2011, now U.S. Pat. No. 9,222,851, which claims the benefit of U.S. Provisional Application No. 61/374,473 filed on Aug. 17, 2010, in the USPTO, the disclosures of which are incorporated herein in their entireties by reference.

BACKGROUND

1. Field

Aspects of the exemplary embodiments relate to a mass-airflow rate measurement for an internal combustion engine, and more particularly to a mass-airflow rate measurement conversion apparatus for internal combustion engine carburetors and a method of retrofitting existing internal combustion engine carburetors with a mass-airflow rate measurement conversion apparatus for internal combustion engine carburetors.

2. Description of the Related Art

Over the last 30 years, an increasing proportion of internal combustion engines have been equipped with electronic fuel injection (EFI). Among the reasons for the switch to EFI, increased reliability, performance, and longevity are key factors, along with significantly tighter engine calibration over the full engine operating range. As of the end of the 1990's, practically all original equipment passenger car engines were converted from carburetion to EFI, and smaller engines like those used on motorcycles quickly followed suit.

The automotive aftermarket also followed the trend, offering EFI conversion systems for existing engine applications. Many of these systems were offered as retrofits to existing carburetion-equipped motors, with the carburetor eliminated and replaced with a throttle body for air flow regulation. A majority of these EFI implementation utilized speed-density (SD) fueling calculation methods, which uses the intake manifold air pressure and temperature to determine cylinder air charge density. The requirement of a SD system is the determination of engine Volumetric Efficiency (VE) as part of the engine calibration process, which can be a difficult task to accomplish without dynamometer facilities and accurate Air-Fuel Ratio (AFR) determination.

Another method of mass air determination for EFI systems is with the use of an external Mass-Air Flow meter (MAF). The use of a MAF sensor is very practical in an aftermarket installation in that it significantly reduces the engine calibration effort.

A significant downside of employing an external MAF sensor in an aftermarket EFI conversion is the fitting and plumbing required to implement a MAF sensor. MAF sensors are very sensitive to upstream and downstream bends or other changes in physical geometry affecting the air stream. These changes in physical geometry can greatly alter the calibration of the MAF sensor's transfer function (i.e., mass air flow to voltage or frequency), thus increasing the installation effort. In addition, for some installations there is a desire to maintain the original "look" of a carburetor without the extra plumbing and duct work required for a proper MAF sensor installation.

Another downside to aftermarket MAF sensor installations is that of intake manifold "filling and emptying" effects. This effect is an artifact change in indicated mass air flow due to changes in throttle position which do not represent the actual engine mass air intake. This effect, if not compensated, can lead to fuel rich conditions during transitions to wide-open throttle and fuel lean situations for rapid throttle closings.

SUMMARY

One or more exemplary embodiments provide a mass-airflow measurement conversion apparatus for internal combustion engine carburetors and a method of retrofitting existing internal combustion engine carburetors with a mass-airflow measurement conversion apparatus for internal combustion engine carburetors.

More specifically, one or more exemplary embodiments provide a mass airflow measurement conversion apparatus for internal combustion engine carburetors. Furthermore, one or more exemplary embodiments provide a method of retrofitting existing internal combustion engine carburetors with a mass-airflow measurement conversion apparatus for internal combustion engine carburetors.

According to an aspect of an exemplary embodiment, there is provided an apparatus which measures mass-airflow for an internal combustion engine. The apparatus includes: a plurality of pressure sensors disposed at different location along an air intake path of an internal combustion engine, each sensor adapted to sense a pressure of air flowing into the internal combustion engine and output an electrical signal as a pressure signal corresponding to the sensed air pressure; and a calculation section which receives the pressure signals and generates a mass air flow signal as an output signal based on the received pressure signals.

The pressure signals may be analog signals, and the calculation section may include one or more analog-to-digital converters which input the analog signals and convert the analog signals to digital pressure signals.

The calculation section may include a processor which inputs the digital pressure signals and processes the digital pressure signals to output a digital signal representing a mass air flow rate; and a memory which stores a program for causing the processor to process the pressure signals.

The calculation section may include a digital-to-analog converter which inputs the digital signal representing the mass air flow rate and outputs an analog voltage signal representing the mass air flow rate and/or a frequency representing the mass air flow rate.

The apparatus may include a throttle position sensor which outputs an analog electrical signal corresponding to a position of a throttle plate which controls the air flowing into the internal combustion engine as a throttle position signal.

The apparatus may include an inlet air temperature sensor disposed at an entrance to the air intake path and adapted to measure temperature of air entering the air intake path and output an electrical signal as a temperature signal corresponding to the sensed air temperature.

The one or more analog-to-digital converters may input the analog electrical signals corresponding to the position of the throttle plate and the inlet air temperature and convert the analog electrical signals to a digital throttle position signal and a digital temperature signal, respectively.

The processor may input the digital throttle position signal, the digital temperature signal, and an engine crankshaft revolutions per minute (rpm) signal and process the digital pressure signals, the digital throttle position signal, the digital temperature signal, and the engine crankshaft revolutions per minute (rpm) signal and output a digital signal representing a mass air flow rate.

According to an aspect of another exemplary embodiment, there is provided mass airflow measurement conversion apparatus for internal combustion engine carburetors. The apparatus includes a carburetor shell including a booster venturi and a throttle plate; a plurality of pressure sensors mounted to the carburetor shell, each sensor adapted to sense a pressure of air flowing into the internal combustion engine at a different position along an air intake path and output an electrical signal as a pressure signal corresponding to the sensed air pressure; an air temperature sensor disposed at an entrance to the air intake path and adapted to measure temperature of air entering the air intake path and output an electrical signal as a temperature signal corresponding to the sensed air temperature; and a calculation section which receives the pressure signals and the temperature signal and generates a mass air flow signal as an output signal based on the received pressure signals.

The carburetor shell may include an access port to operatively connect one pressure sensor of the plurality of pressure sensors to a pressure of air flowing through the booster venturi; and another access port to operatively connect a another pressure sensor of the plurality of pressure sensors to a pressure of air below the throttle plate.

The calculation section may generate an output signal corresponding to a mass air flow rate based on the temperature signal and signals from the pressure sensors corresponding to the pressure of air flowing through the booster venturi and the pressure of air below the throttle plate.

The carburetor shell may include an additional access port to operatively connect an additional pressure sensor of the plurality of pressure sensors to a pressure of incoming air to sense barometric pressure.

The calculation section may generate an output signal corresponding to a mass air flow rate based on the temperature signal and signals from the pressure sensors corresponding to the pressure of air flowing through the booster venturi, the pressure of air below the throttle plate, and the pressure of incoming air.

The apparatus may include a throttle position sensor which outputs a throttle position signal corresponding to a position of a throttle plate.

The calculation section may generate an output signal corresponding to a mass air flow rate based on the temperature signal, the throttle position signal, signals from the pressure sensors corresponding to the pressure of air flowing through the booster venturi, the pressure of air below the throttle plate, and the pressure of incoming air, and an engine crankshaft revolutions per minute (rpm) signal.

The calculation section may output the mass air flow rate as a voltage signal or a frequency signal.

According to an aspect of a further exemplary embodiment, there is provided a method of determining a mass air flow rate for an internal combustion engine including a carburetor shell comprising a booster venturi, a throttle plate, and access ports operatively connected to atmospheric barometric pressure, booster venturi pressure, and manifold absolute pressure.

The method includes sensing atmospheric barometric pressure, booster venturi pressure, and manifold absolute pressure using an atmospheric barometric pressure sensor, booster venturi pressure sensor, and manifold absolute pressure sensor, respectively; sensing temperature of inlet air to the internal combustion engine using a temperature sensor; sensing throttle plate position using a throttle position sensor; sensing internal combustion engine crankshaft revolutions per minute (rpm) using rpm sensor; calculating mass airflow rate for both isentropic conditions and non-isentropic conditions based on the sensed atmospheric barometric pressure, booster venturi pressure, and manifold absolute pressure, inlet air temperature and crankshaft rpm with a processor; blending the calculated isentropic mass airflow rate and the calculated non-isentropic mass airflow rate based on the sensed throttle position; integrating the blended mass airflow rate; and generating a mass airflow rate output signal based on the integrated mass airflow rate.

The mass airflow rate output signal may be a voltage signal or a frequency signal.

The mass airflow rate output signal may be provided to an engine control module (ECM) for the internal combustion engine.

According to an aspect of a still further exemplary embodiment, there is provided a method of retrofitting an existing internal combustion engine carburetor with a mass airflow rate measurement conversion. The method includes rendering inoperative a fuel bowl and associated orifices, air bleeds, and emulsion tubes from the carburetor; installing pressure sensors which measure air pressure at several different points along an airflow path through the carburetor, an air temperature sensor, and a throttle angle position sensor; and installing a controller which receives and processes information received from the sensors and generates an output signal representing engine mass air flow rate.

The controller may be installed remotely from the carburetor.

BRIEF DESCRIPTION OF THE DRAWINGS

The above and other aspects will become more apparent by describing in detail exemplary embodiments with reference to the attached drawings in which.

DETAILED DESCRIPTION

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout. In this detailed description, the term "unit" denotes a hardware component and/or a software component that is executed by a hardware component such as a processor.

The present inventive concept provides a novel approach to a modification of an existing carburetor for dual utilization as both a throttle body and an electronic mass air flow measurement device. The modifications include adding electronic absolute pressure sensors to measure air pressure at several points along the carburetor profile, an air temperature sensor, and a throttle angle position sensor. A controller consisting of, for example, but not limited to, a microcontroller or programmable logic is used to process the information, with the resulting generated output signal representing engine mass air flow rate. The mass air flow rate signal can be used by any EFI control system as an indicator of engine mass air.

Since EFI throttle bodies and MAF sensors together represent a significant portion of the cost of converting an existing engine to EFI, a significant savings can be realized by this conversion, and a superior MAF/EFI system can be obtained as opposed to a less accurate SD/EFI system. The resulting modification would provide greatly improved engine control relative to the original carburetor, both in performance, drivability and emissions, and also preserve the "retro" appearance of the original carburetor.

In order to fully recognize the exemplary embodiments as described herein, it is helpful to understand the basic operation of a fuel-metering carburetion device. The main goal of a carburetor is to meter in combustible fuel in a desired proportion to incoming mass air, and to accomplish this over all operational and environmental conditions. Most carburetors utilize several different fuel metering schemes depending on operating situations. During normal cruise and wide-open throttle (WOT) a mechanical venturi-booster arrangement is often used to meter and maintain a desired air-fuel ratio (AFR). For low speed and closed-throttle situations the mass air flow across the venturi is not sufficient to provide an adequate booster signal, so an independent idle bleed circuit is often employed. An additional transitional circuit comes into play under off-idle situations as a blend between the idle and booster circuits. Finally, to overcome manifold wall-wetting transient effects an accelerator pump arrangement is used to introduce additional fuel during open-throttle events.

Figure 1:
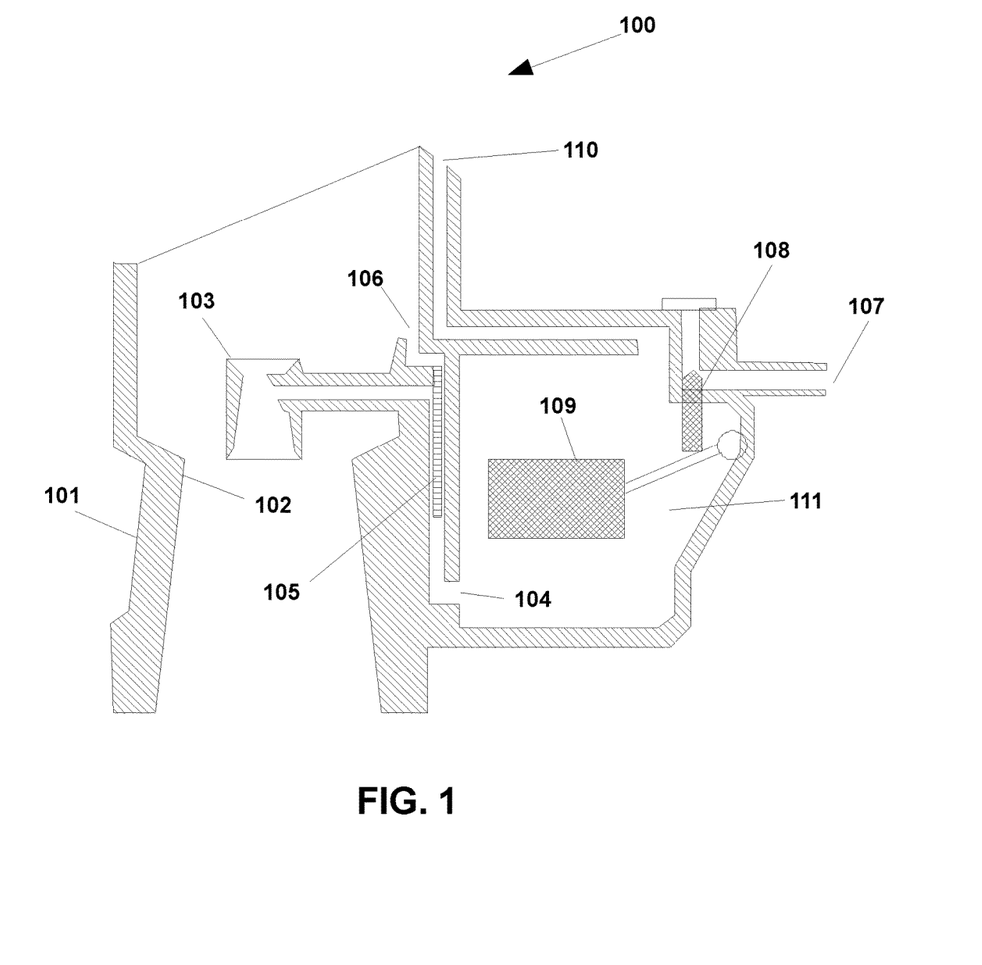
FIG. 1 is a cross-section of a representative carburetor used for fuel metering for an internal combustion engine.

FIG. 1 is a cross-section of a representative carburetor used for fuel metering for an internal combustion engine. The representative carburetor 100 consists of an exterior housing 101 which encompasses an air-path venturi 102 used to channel incoming air for downstream engine combustion. To increase air velocity, booster venturi 103 is situated to produce a pressure which is functionally related to mass air flow rate. The booster venturi 103 is also used to introduce liquid fuel into the air-stream. To meter and regulate the ratio of air to fuel, the carburetor 100 employs several mechanical devices; metering jets 104, emulsion tube 105, and air bleed 106 are all examples. To regulate the supply of fuel entering the carburetor 100 from fuel inlet 107, a needle/seat arrangement 107 along with a fuel level float 109 disposed in a fuel bowl 111, and fuel bowl vent 110 are employed.

Figure 2:
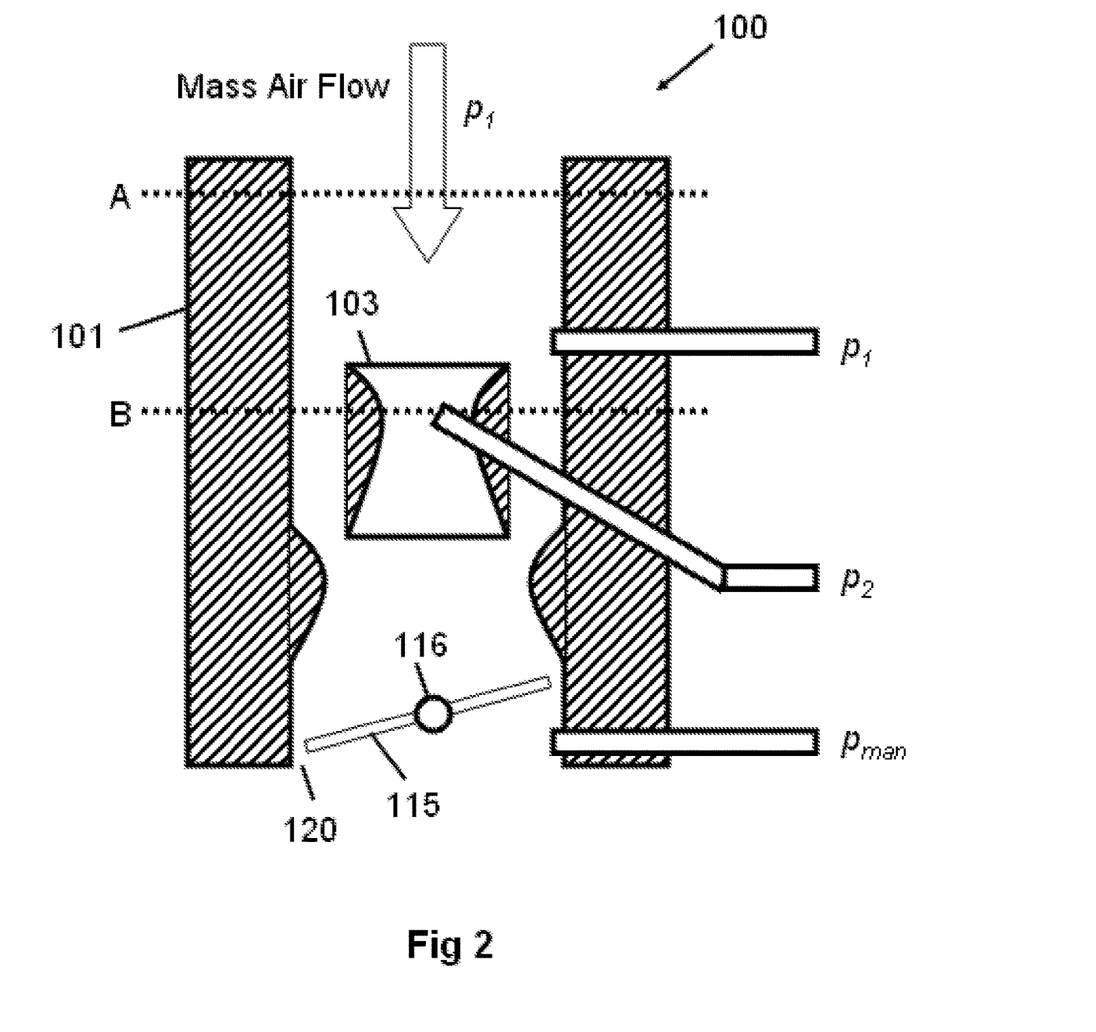
FIG. 2 is diagram illustrating representative carburetor operation for determining mass air flow.

The venturi-booster circuit, which includes the booster venturi 103, metering jets 104, emulsion tube 105, and air bleed 106, provides the main fuel metering for part-throttle and full-throttle positions of the throttle plate 115 (see FIG. 2). In order to numerically determine the booster pressure signal it is required to relate the pressure drop presented by the venturi relative to ambient to mass air flow rate.

FIG. 2 is diagram illustrating representative carburetor operation for determining mass air flow. Referring to FIG. 2, applying the steady flow energy equation to carburetor air inlet A and booster venturi 103 throat B per unit mass flow of air results in equation 1:

$$q - w = (h_2 - h_1) + \tfrac{1}{2}(C_2^2 - C_1^2) \tag{1}$$

Here, q and w are the heat and work transfers from the entrance to the throat and h and C stand for enthalpy and velocity respectively. If reversible adiabatic conditions are assumed, and there is no work transfer, q=0, w=0, and if approach velocity $C_1 \approx 0$, then:

$$C_2 = \sqrt{2(h_1 - h_2)} \tag{2}$$

Assuming air to be a perfect gas, $h = c_p T$, then $$C_2 = \sqrt{2c_p(T_1 - T_2)} \tag{3}$$

If the distance from the inlet A to the venturi throat B is relatively short, as is the case in a mechanical carburetor, air flow can be considered to behave in an isentropic manner in the ideal case, then $$\frac{T_2}{T_1} = \left(\frac{p_2}{p_1}\right)^{\frac{\gamma-1}{\gamma}} \tag{4}$$

$$T_1 - T_2 = T_1 \left[1 - \left(\frac{p_2}{p_1}\right)^{\frac{\gamma-1}{\gamma}}\right] \tag{5}$$

where $\gamma$ is the ratio of specific heats for air. Substituting Eq. 5 in Eq. 3 yields:

$$C_2 = \sqrt{2c_p T_1 \left[1 - \left(\frac{p_2}{p_1}\right)^{\frac{\gamma-1}{\gamma}}\right]} \tag{6}$$

The continuity equation can be used to obtain the theoretical mass flow rate of air:

$$m'_a = \rho_1 A_1 C_1 = \rho_2 A_2 C_2 \tag{7}$$

where $A_1$ and $A_2$ are the cross-sectional areas at the air inlet A (point 1) and venturi throat B (point 2).

To calculate the mass flow rate of air at the throat B, air flow up to the throat B is assumed to be isentropic, so the adiabatic process equation relating p and v (or $\rho$) can be used:

$$p_1 v_1^\gamma = p_2 v_2^\gamma \tag{8A}$$
$$\frac{p_1}{\rho_1^\gamma} = \frac{p_2}{\rho_2^\gamma}$$

$$\rho_2 = \rho_1 \left(\frac{p_2}{p_1}\right)^{\frac{1}{\gamma}} \tag{8B}$$

$$m'_a = \rho_1 \left(\frac{p_2}{p_1}\right)^{\frac{1}{\gamma}} A_2 \sqrt{2c_p T_1 \left[1 - \left(\frac{p_2}{p_1}\right)^{\frac{\gamma-1}{\gamma}}\right]} \tag{9}$$

For a perfect gas the Ideal Gas Law relation can be used to determine density:

$$\rho_1 = \frac{p_1}{RT_1} \tag{9A}$$

Thus, $$m'_a = \left(\frac{p_2}{p_1}\right)^{\frac{1}{\gamma}} \frac{p_1}{RT_1} A_2 \sqrt{2c_p T_1 \left[1 - \left(\frac{p_2}{p_1}\right)^{\frac{\gamma-1}{\gamma}}\right]} \tag{10A}$$

Recombining the above equation:

$$m'_a = \frac{A_2 p_1}{R\sqrt{T_1}} \sqrt{2c_p\left[\left(\frac{p_2}{p_1}\right)^{\frac{2}{\gamma}} - \left(\frac{p_2}{p_1}\right)^{\frac{\gamma+1}{\gamma}}\right]} \quad (10B)$$

Since the carburetor operates on atmospheric-proportioned gas mixtures, numerical values can be substituted for several variables: R=287 J/kgK, $c_p$=1005 J/kgK, and γ=1.4, and $m_a'$ in units of Kg/sec:

$$m'_a = 0.1562 \frac{A_2 p_1}{\sqrt{T_1}} \sqrt{\left(\frac{p_2}{p_1}\right)^{1.43} - \left(\frac{p_2}{p_1}\right)^{1.71}} \quad (11)$$

$$= 0.1562 \frac{A_2 p_1}{\sqrt{T_1}} \phi$$

where $$\phi = \sqrt{\left(\frac{p_2}{p_1}\right)^{1.43} - \left(\frac{p_2}{p_1}\right)^{1.71}} \quad (12)$$

Here, pressure p is in pascals (Pa), area A is in m², and temperature T is in K.

Equation 11 gives the theoretical mass flow rate of air. The actual mass flow rate, $m_a$, can be obtained by multiplying the equation by the coefficient of discharge for the booster venturi 103, $C_{d,a}$. Thus, $$m_{a\_venturi} = 0.1562 C_{d,a} \frac{A_2 p_1}{\sqrt{T_1}} \phi \quad (13)$$

where $$C_{d,a} = \frac{m_{a\_venturi}}{m'_a} \quad (14)$$

At the minimum area position in the booster venturi 103 area the critical pressure ratio is the point where the flow velocity reaches the speed of sound:

$$\phi_{Sonic} = \left(\frac{2}{k+1}\right)^{\frac{k}{k-1}} = 0.5283 \quad (15)$$

This factor limits equation (12) above to sonic flow rate.

Equation 13 relates mass air flow rate to pressure at entrance to the carburetor 100, booster venturi 103, and air temperature at entrance of carburetor 100. In a normal carburetor 100 setup the booster venturi pressure $p_2$ is used to pull in fuel that resides within a fuel bowl 111, often with various orifices and air bleeds in order to maintain a desired AFR over a wide operating range.

With the inventive concept described herein, in the air intake path of an internal combustion engine air pressures within the carburetor and engine manifold as well as throttle plate position are measured. In an exemplary embodiment, the fuel bowl and associated orifices, air bleeds, and emulsion tubes are rendered inoperative by mechanical means by, for example, removing them from the carburetor, or plugging or blocking related orifices and/or passages, or a combination both as required. A carburetor having the fuel bowl and associated orifices, air bleeds, and emulsion tubes rendered inoperative is hereinafter defined as a carburetor shell. Often the above components to be removed reside in a separate metering block making removal simple. Fitted in carburetor shell are pressure sensors which detect air pressure signals from the carburetor shell air entrance, venturi booster, and manifold (manifold absolute pressure).

Figure 3:
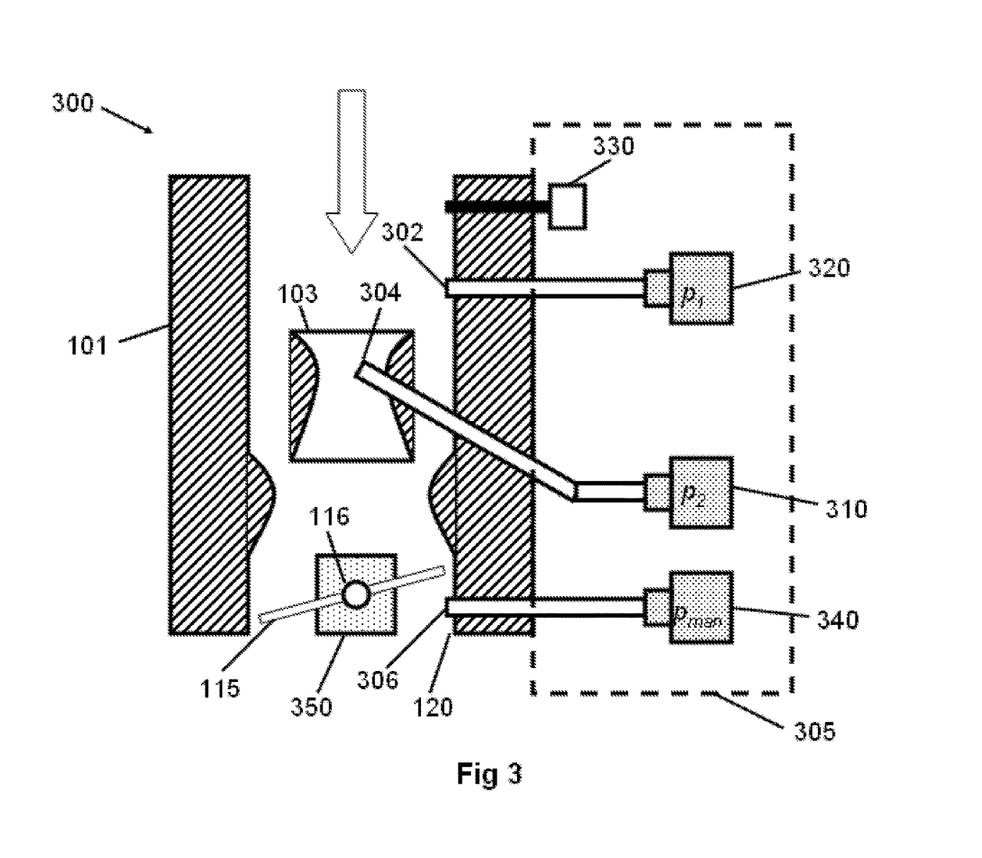
FIG. 3 is a diagram illustrating representative placement of measurement sensors according to an exemplary embodiment.

FIG. 3 is a diagram illustrating representative placement of measurement sensors with respect to a carburetor shell according to an exemplary embodiment.

Referring to FIG. 3, a carburetor shell 300 includes openings, or access ports, disposed at various locations to access various air pressures with respect to air passing through the carburetor shell 300. A first pressure sensor device 320 may be used to sense atmospheric barometric pressure $p_1$ using a first access port 302. The atmospheric barometric pressure $p_1$ measurement may be a direct measurement. The first pressure sensor device 320 may be an electronic pressure sensor device. The first pressure sensor device 320 may be an absolute pressure sensor device. Booster venturi pressure $p_2$ is measured by a second pressure sensor device 310 using a second access port 304. The booster venturi pressure $p_2$ measurement may be a direct measurement. The second pressure sensor device 310 may be an electronic pressure sensor device. The second pressure sensor device 310 may be an absolute pressure sensor device.

As an alternative to using a first pressure sensor, a barometer value at a no-airflow condition may be obtained using a numerical value indicated by the second pressure sensor 310, and the numerical value stored and used as the as the atmospheric barometric pressure $p_1$ value.

Also required in equation 13 is the inlet air temperature $T_1$ which along with the atmospheric barometric pressure $p_1$ yields the density of incoming air. To determine inlet air temperature $T_1$, a temperature sensor device 330, for example but not limited to a thermistor, may be placed in the incoming air stream.

To determine the numerical mass flow rate, a coefficient of discharge, along with booster venturi 103 area are required variables in equation 13. The coefficient of discharge and booster venturi 103 area can be obtained by assigning a value representing their combined values to an electrical signal generated by a variable potentiometer (not shown), which can be, for example but not limited to, an ADC input to the microcontroller, and can be manually or automatically adjusted until the air flow measured by, for example but not limited to, a standard air flow meter, laminar flow element, or similar device matches an output value from the microcontroller. This output value, measured one time, can be stored as a calibration value. Alternatively, a user can adjust the output value until the measured air/fuel ratio calculated by an engine management system (EMS) matches the ratio read by the EMS from an oxygen sensor attached to the engine.

With the booster venturi arrangement, for small throttle opening conditions (i.e., idle) there is little air movement across the booster venturi, and subsequent pressure signals may not be sufficient to detect mass air flow. In other words, the booster venturi pressure $p_2$ value (equation 13) will be the same as the atmospheric barometric pressure $p_1$, thus yielding zero flow rate in the equation. Small throttle openings occur at engine idle and deceleration situations, and while there is a small amount of mass air flow, in practical terms the booster venturi pressure $p_2$ will not provide an adequate signal. However, it is important to provide accurate mass air flow information for all engine operating modes.

For this situation it is possible to use the air flow across the throttle plate 115 as a means to determine accurate mass air flow rate. Assuming isentropic flow across the throttle plate 115, the same derivation above can be used to determine mass air flow rate. In this case, manifold absolute pressure (MAP) $p_{man}$ below the throttle plate 115 is sensed with a third pressure sensor device 340 using access port 306 and inserted in equation 13 in place of booster venturi pressure $p_2$. The manifold absolute pressure $p_{man}$ measurement may be a direct measurement. The third pressure sensor device 340 may be an electronic pressure sensor device. The third pressure sensor device 340 may be an absolute pressure sensor device. The atmospheric barometric pressure $p_1$ and inlet air temperature $T_1$ are determined at the entrance to the carburetor. In addition, a sensor is required to determine throttle angle. This is accomplished with a throttle position sensor (TPS) 350, which may be a resistive potentiometers which provides a voltage that represents the instantaneous throttle angle.

The isentropic relation for the throttle plate mass air flow rate determination is the following form, similar to the booster venturi mass air determination derivation outlined previously:

$$m_{a\_throttle} = 0.1562 C_{th} \frac{A_{th} p_1}{\sqrt{T_1}} \phi_2 \tag{16}$$

$$\phi_2 = \sqrt{\left(\frac{p_{man}}{p_1}\right)^{1.43} - \left(\frac{p_{man}}{p_1}\right)^{1.71}} \tag{17}$$

where $\phi_2$ is the isotropic functional relation for pressure ratio, derived in a comparable manner to the venturi relation shown in equation 12 but with $p_{man}$ and $p_1$ absolute pressures, $C_{th}$ is the coefficient of discharge for the throttle plate 115, and $A_{th}$ is the effective area of the throttle opening given by:

$$A_{th} = \frac{\pi}{2} D^2 \left[1 - \frac{\cos(\theta - \theta_0)}{\cos(\theta_0)}\right] \tag{18}$$

with $\theta_0$ representing the throttle angle when fully closed and $\theta$ representing the throttle angle relative to $\theta_0$, both throttle angles measured by the TPS 350, and D is the diameter of the throttle bore 120. For multiple bore carburetor arrangements the isentropic mass air flow is computed individually and each resultant mass air flow rate for each bore is summed to create the final mass air flow rate.

Depending on operating conditions (i.e., idle, cruise, wide-open-throttle (WOT)) there will be a choice of the two mass air flow calculations described above, or a blend of the two methods together to represent a transition from isentropic throttle to venturi mass air flow. There are many forms of blending operations known in the art, the simplest is a basic proportional filter arrangement:

$$m_{a\_tot}(G^* m_{a\_venturi}) + ((1-G)^* m_{a\_throttle}) \tag{19}$$

where G is a decided function of throttle angle $\theta$. In the equation 19, G ranges from 0 to 1 and determines the influence of both throttle and venturi calculations in the final mass air flow rate value. It should be realized that the functional range of G may only exist in a narrow range of throttle angles where the blend operation is desired—outside of this region the numerical function will be either 0 or 1, which indicates either full isentropic throttle or full venturi mass air rate calculation influence on the output.

In any mass air flow measurement method which senses rate at the entrance of the intake manifold there exists a phenomenon known as manifold filling/emptying which can lead to erroneous measurement of mass air flow. This effect occurs when the volume of the intake manifold is significant and can act as a pressure reservoir. Any sudden changes in throttle position will result in equalization of the manifold pressure resulting in a mass air flow movement that is not representative of the engine ingested air. Since the mass air flow is used in engine fuel calculation it is important to compensate for the filling/emptying effect. This compensation can be implemented in the EMS controller, however, the majority of existing EMS controllers do not implement this correction. The present inventive concept may implement this correction and provide a mass air flow rate signal that is representative of the engine air intake under all situations. A compensator for manifold filling effects has the following form:

$$\Delta p_{man} = \left(\frac{RT}{V_{man}}\right) * (m_{a\_th} - m_e) \tag{20}$$

Equation 20 indicates that the change in manifold pressure ($\Delta p_{man}$) is simply the mass air entering the manifold through the throttle ($m_{a\_th}$) minus the air actually entering the engine ($m_e$). The variable $V_{man}$ is the intake manifold volume, R is the universal gas constant and T is the throttle intake temperature. Note that this relation represents the mass air on each cylinder event. Therefore, the mass air flow rate derived above will need to be numerically integrated over each cylinder cycle. To accomplish this, knowledge of the engine crankshaft revolutions per minute (rpm) is required and may be obtained by providing an external tachometer reference into the embodiment (see FIG. 4). This allows the mass air flow rate to be integrated over a cylinder cycle yielding mass air flow for the cylinder. Equation 20 may then be used to determine actual engine mass air ($m_e$) entering the cylinder from manifold pressure change over the cylinder cycle. The variable $m_e$ is subsequently converted back into a mass air flow rate by dividing it by the integration time and the resulting value used as the output mass flow rate variable.

Another property of MAF systems is that mass air flow varies during the engine cycle due to air ingestion by different cylinders at different times, and the ingestion period for each cylinder only occupies a part of the total engine cycle. Hence, the accuracy of the mass air calculation may be affected by the time at which the air is sampled. Avoiding this effect is another reason for implementing the above mass air flow integration and averaging.

Referring again to FIG. 3, the pressure sensors utilized may be absolute pressure sensor devices used for sensing carburetor and manifold pressures, for example but not limited to, the Freescale MPXH6115 absolute pressure sensor. The pressure sensor devices 310, 320, 340 and the air temperature sensor device 330 may be mounted into a sensor block 305 which may replace a carburetor metering block, or the pressure sensor devices 310, 320, 340 and the air temperature sensor device 330 may be separately mounted. The air temperature sensor device 330 may be disposed in the entrance air stream. Throttle position sensing is accomplished with a TPS 350 that is fitted to the throttle shaft 116.

Figure 4:
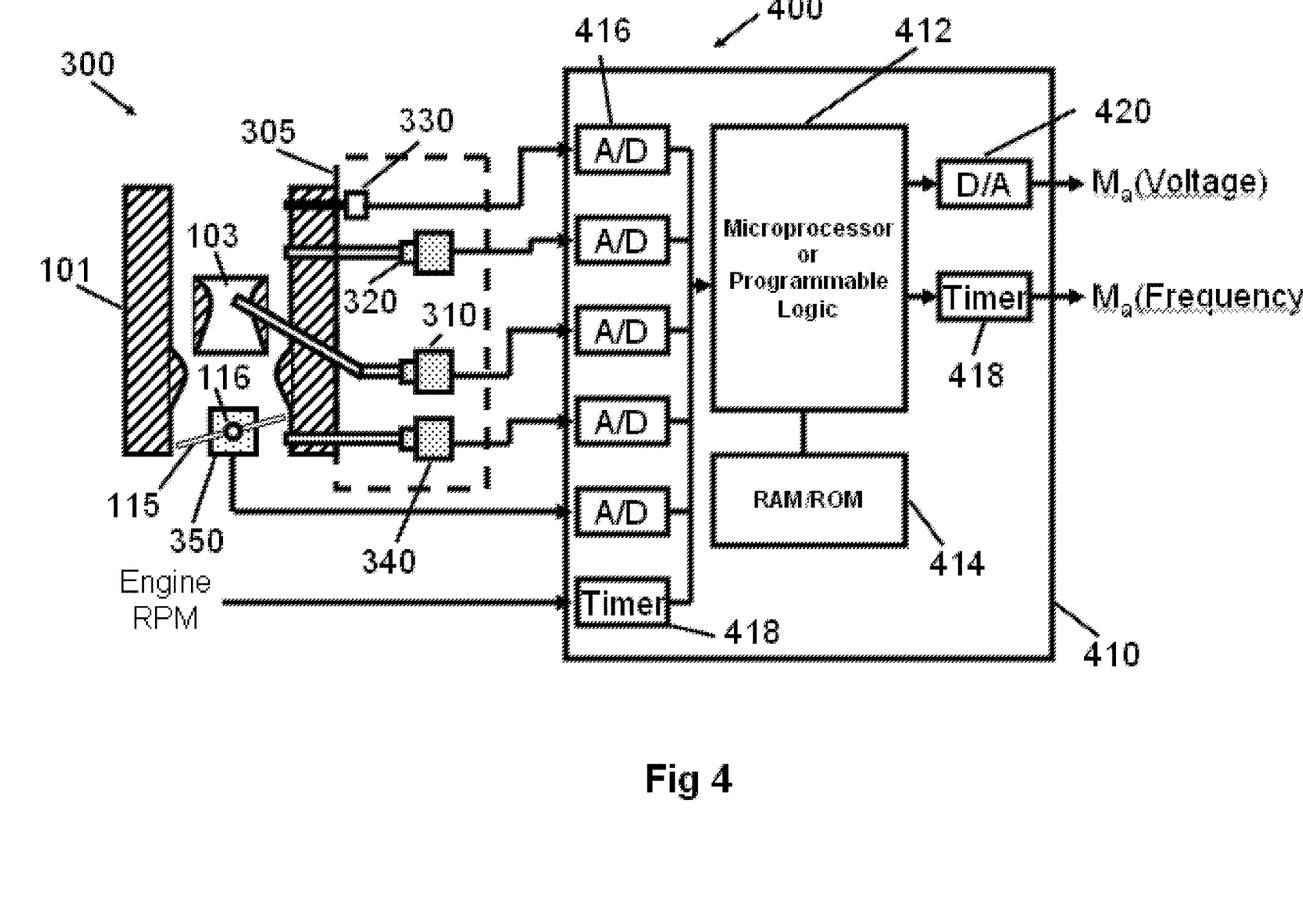
FIG. 4 is a block diagram illustrating a mass-airflow measurement conversion apparatus for internal combustion engine carburetors according to an exemplary embodiment.

FIG. 4 is a block diagram illustrating a mass-airflow measurement conversion apparatus for internal combustion engine carburetors according to an exemplary embodiment.

Referring to FIG. 4, the mass-airflow measurement conversion apparatus 400 includes an arrangement of sensors for detecting pressure, temperature, throttle position, and engine crankshaft speed, and computation means for generating the mass air flow output signal, $M_a$, are illustrated. A calculation section 410 includes, for example but not limited to, a microcontroller, microprocessor, or programmable logic device capable of performing numerical computations as computation means. A microcontroller 412 may be utilized which contains the support memory and internal blocks for processing external voltages and frequencies. A microprocessor or programmable logic approach is equally applicable. External memory 414, i.e., external to the processor, and/or one or more analog-to-digital converters (A/D) 416, and/or one or more digital-to-analog converters 420, and/or one or more timer channels 418 may be added to the system.

Also provided is a method of calculating engine mass airflow rate. The method may be embodied as computer readable codes on a computer readable recording medium. The computer readable recording medium is any data storage device that can store data which can be thereafter read by a computer system. Examples of the computer readable recording medium include read-only memory (ROM), random-access memory (RAM), flash memory cards, CD-ROMs, magnetic tapes, magnetic disks, floppy disks, optical data storage devices, etc. The computer readable recording medium can also be distributed over network coupled computer systems so that the computer readable code is stored and executed in a distributed fashion.

The calculation of engine mass air flow rate is performed by the calculation section 410, and the resulting numerical value is output as either a representative frequency or voltage, or both the calculation section outputs the mass air flow rate as a voltage signal or a frequency signal. Both output types are provided in order to accommodate different engine control modules (ECMs), some of which may require voltage inputs and others of which may require frequency inputs to denote mass air flow rate. In addition, a transfer curve output needs to be known by the ECM in order to correlate into mass air flow rate values, but this is true for any conversion from a carbureted engine to EFI. And the transfer curve is only a function of rpm, as opposed to SD which requires tuning of a table which is a function of rpm and load (pressure).

Figure 5:
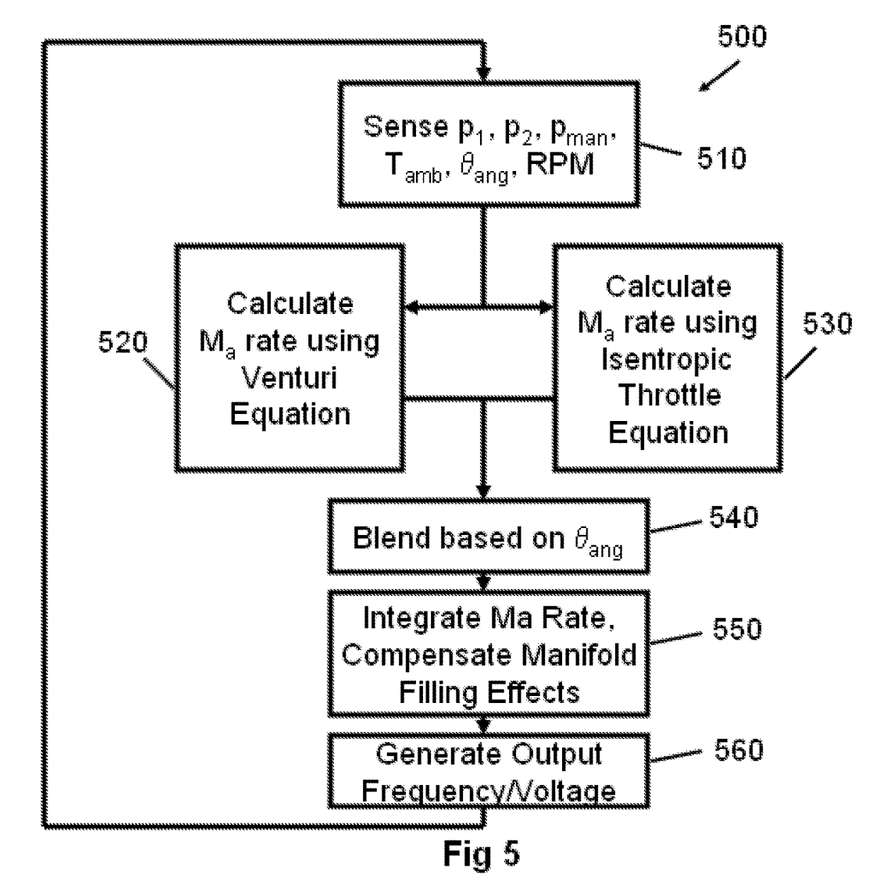
FIG. 5 is a flowchart of processing used to determine mass air flow rate according to an exemplary embodiment.

FIG. 5 is a flowchart of processing used to determine mass air flow rate according to an exemplary embodiment. Referring to FIG. 5, the process (500) begins with time digitization sampling of analog values obtained from sensor devices indicating atmospheric barometric pressure $p_1$, booster venturi pressure $p_2$, manifold absolute pressure $p_{man}$, inlet air temperature $T_1$, engine speed, and throttle angle θ (510). The sensor numerical values are scaled into physical units (i.e., kilopascals, deg C., angle in radians) and used in the venturi mass air determination calculations (520) (see equation 11) and throttle plate isentropic mass air determination calculations (530) (see equation 16). The calculation results of these are then blended into a merged mass air flow rate (540) (see equation 19).

Determination of the weighting factor G in equation 19 as a function of the throttle angle obtained from the TPS may be performed using at least two methods. A first method is to measure airflow through the carburetor at the factory using a flow bench with a laminar flow element or other independent measuring device while at the same time, for each throttle angle step covering the range of operation, measure the air pressures at the throat entrance, at the booster venturi, and below the throttle plate. The two mass air flow rates from these pressures, at the venturi and through the throttle, are inserted in equation 19 and the total mass air flow from the flow bench is set as $m_{a\_tot}$. Equation 19 is then solved for the weighting factor G and the process repeated until all throttle angles are covered.

A second method is for the end user to determine the weighting factor, G, for the specific engine configuration being used. In this method, a family of curves for G vs. throttle position is generated by calculating actual mass air flow rate based on a measurement, afr_ego, from an exhaust gas oxygen sensor. Knowing the fuel injector mass fuel flow rate, $m_{f\_tot}$, a number typically provided by the injector manufacturer, the mass air flow rate can be obtained as: $m_{a\_tot} = m_{f\_tot} \times \text{afr\_ego}$. This data would be used in practice with the equation above to determine mass air flow rate from injected fuel mass quantity and air/fuel ratio. The mass air flow rate value is then used in equation 19 in a similar manner as described in the first method.

The output for either method would be a table of values for G as a function of throttle angle. The merged mass air flow rate calculated from equation 19 is then integrated over each engine cylinder cycle and manifold compensation is applied to correct for filling/emptying effects (550). The final mass air flow rate is output both in variable voltage and variable frequency formats (560).

The inventive concept may also be applied using a carburetor shell having a plurality of booster venturis and/or throttle plates. In the case of multiple booster venturis an additional pressure sensor for each booster venturi measures the pressure of air flowing through the venturi. The electrical signals from the additional sensors are input to the calculation section and processed as described above to produce the mass air flow rate output signal.

In accordance with exemplary embodiments, the modified carburetor device is no longer capable of metering fuel directly; this function is handled by the EMS which controls external fuel injector devices, as known in the art. It is also possible for a single or plural number of injectors to be located directly above the modified carburetor device, in a so-called shower arrangement. The location of the external fuel injectors are of no consequence to the invention and its functionality.

While the present inventive concept has been particularly shown and described with reference to exemplary embodiments thereof, it will be understood by those of ordinary skill in the art that various changes in form and details may be made therein without departing from the spirit and scope of the present inventive as defined by the following claims.

What is claimed is:

1. A controller for an electronic fuel injection system for an internal combustion engine, the controller comprising:
a plurality of analog-to-digital (A/D) converters;
a memory;
and a processor communicatively coupled to the plurality of A/D converters and the memory,
wherein:
the plurality of A/D converters are configured to receive analog electrical signals representing pressures generated by a plurality of pressure sensors disposed at different locations along an air intake path of the internal combustion engine and output corresponding digital signals representing the pressures,
one or more of the plurality of pressure sensors are disposed in a body of a carburetor rendered permanently inoperable to mix fuel with air flowing in the air intake path, and the processor is configured to receive the digital signals representing the pressures output from the plurality of A/D converters and output a mass air flow signal representing a mass air flow rate as to an engine management system to control the electronic fuel injection system based on the received pressure signals.

2. The controller of claim 1, wherein the plurality of pressure sensors comprises a booster venturi pressure sensor disposed on the carburetor,
wherein the booster venturi pressure sensor is configured to output an analog signal corresponding to booster venturi pressure.

3. The controller of claim 1, wherein the memory stores a program including instructions for causing the processor to process the signals representing pressures and generate the mass air flow signal.

4. The controller of claim 1, further comprising:
a digital-to-analog (D/A) converter,
wherein the mass air flow signal generated by the processor is a digital signal,
the D/A converter is configured to input the digital signal generated by the processor, and
output an analog voltage signal representing the mass air flow rate.

5. The controller of claim 1, further comprising:
a first timer,
wherein the mass air flow signal generated by the processor is a digital signal,
the first timer is configured to input the digital signal generated by the processor, and
output a signal having a frequency representing the mass air flow rate.

6. The controller of claim 1, further comprising:
a timer configured to input an analog electrical signal generated by an engine crankshaft revolutions-per-minute (RPM) sensor and output a digital signal representing engine crankshaft RPM,
wherein the plurality of A/D converters are further configured to:
receive an analog electrical signal corresponding to air temperature at an entrance to the air intake path generated by an inlet air temperature sensor disposed at the entrance to the air intake path and output a digital signal representing inlet air temperature,
receive an analog electrical signal corresponding to a position of a throttle plate that controls air flowing into the internal combustion engine through the carburetor generated by a throttle position sensor and output a digital signal representing a throttle plate position,
wherein the processor inputs the digital signals representing the engine crankshaft RPM, the inlet air temperature, and the throttle plate position, and processes the digital signals representing the pressures, the throttle plate position, the inlet air temperature, and the engine crankshaft RPM and outputs a digital signal representing the mass air flow rate.

7. The controller of claim 6, further comprising:
a digital-to-analog (D/A) converter,
wherein the mass air flow signal generated by the processor is a digital signal,
the D/A converter is configured to input the digital signal generated by the processor, and
output an analog voltage signal representing the mass air flow rate.

8. The controller of claim 6, further comprising:
a second timer,
wherein the mass air flow signal generated by the processor is a digital signal,
the timer is configured to input the digital signal generated by the processor, and
output a signal having a frequency representing the mass air flow rate.

9. A method for controlling an electronic fuel injection system for an internal combustion engine with a controller including a plurality of analog-to-digital (A/D) converters; a memory; and a processor, the method comprising:
receiving, from a plurality of pressure sensors disposed at different locations along an air intake path of the internal combustion engine, analog electrical signals corresponding to pressures sensed by the plurality of pressure sensors, wherein one or more of the plurality of pressure sensors are disposed in a body of a carburetor rendered permanently inoperable to mix fuel with air flowing in the air intake path,
converting, by the plurality of analog-to-digital (A/D) converters, the analog electrical signals corresponding to the pressures received from the plurality of pressure sensors to corresponding digital signals representing the pressures,
inputting to the processor the digital signals representing the pressures output from the plurality of A/D converters,
and generating, by the processor, a mass air flow signal representing a mass air flow rate as an output signal to an engine management system to control the electronic fuel injection system based on the received pressure signals.

10. The method of claim 9,
further comprising receiving, by the plurality of A/D converters, an analog signal corresponding to booster venturi pressure from a booster venturi pressure sensor disposed on the carburetor.

11. The method of claim 9, further comprising causing the processor to process the pressure signals and generate the mass air flow signal according to instructions included in a program stored in a memory.

12. The method of claim 9, further comprising:
converting, by a digital-to-analog (D/A) converter, the mass air flow signal generated by the processor from a digital signal to an analog voltage signal representing the mass air flow rate; and
outputting, by a digital-to-analog (D/A) converter, the analog voltage signal representing the mass air flow rate to the engine management system to control the electronic fuel injection system.

13. The method of claim 9, further comprising:
inputting a digital mass air flow signal generated by the processor to a timer; and
outputting, by the timer, a signal having a frequency representing the mass air flow rate to the engine management system to control the electronic fuel injection system.

14. The method of claim 9, further comprising:
receiving, by a first timer, an analog electrical signal generated by an engine crankshaft revolutions-per-minute (RPM) sensor;
outputting, by the first timer, a digital signal representing engine crankshaft RPM;
receiving, by the plurality of A/D converters, an analog electrical signal corresponding to air temperature at an entrance to the air intake path generated by an inlet air temperature sensor disposed at the entrance to the air intake path;

outputting, by the plurality of A/D converters, a digital signal representing inlet air temperature;

receiving, by the plurality of A/D converters, an analog electrical signal corresponding to a position of a throttle plate that controls air flowing into the internal combustion engine through the carburetor generated by a throttle position sensor;

outputting, by the plurality of A/D converters, a digital signal representing a throttle plate position;

inputting, by the processor, the digital signals representing the engine crankshaft RPM, the inlet air temperature, and the throttle plate position, and processes the digital signals representing the pressures, the throttle plate position, the inlet air temperature, and the engine crankshaft RPM; and outputting, by the processor, a digital signal representing a mass air flow rate.

15. The method of claim 14, further comprising:

converting, by a digital-to-analog (D/A) converter, the mass air flow signal generated by the processor from a digital signal to an analog voltage signal representing the mass air flow rate; and outputting, by a digital-to-analog (D/A) converter, the analog voltage signal representing the mass air flow rate to the engine management system to control the electronic fuel injection system.

16. The method of claim 14, further comprising:

inputting a digital mass air flow signal generated by the processor to a second timer; and outputting, by the second timer, a signal having a frequency representing the mass air flow rate to the engine management system to control the electronic fuel injection system.

\* \* \* \* \*